(12) United States Patent
Tatemura et al.

(10) Patent No.: US 8,380,738 B2
(45) Date of Patent: Feb. 19, 2013

(54) SYSTEM AND METHODS FOR DATABASE DISTRIBUTION AND QUERYING OVER KEY-BASED SCALABLE STORAGE

(75) Inventors: Junichi Tatemura, Sunnyvale, CA (US); Arsany Sawires, San Jose, CA (US); Hyun Jin Moon, Newark, CA (US); Oliver Po, San Jose, CA (US); Wang Pin Hsiung, Santa Clara, CA (US); V. Hakan Hacigumus, San Jose, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 460 days.

(21) Appl. No.: 12/642,812

(22) Filed: Dec. 20, 2009

(65) Prior Publication Data

US 2010/0241629 A1    Sep. 23, 2010

Related U.S. Application Data

(60) Provisional application No. 61/160,854, filed on Mar. 17, 2009.

(51) Int. Cl.
*G06F 17/00* (2006.01)
(52) U.S. Cl. .......................... 707/770; 707/760
(58) Field of Classification Search .................. 707/760, 707/770
See application file for complete search history.

(56) References Cited

U.S. PATENT DOCUMENTS

| | | | |
|---|---|---|---|
| 4,769,772 A * | 9/1988 | Dwyer | 707/714 |
| 6,523,028 B1 * | 2/2003 | DiDomizio et al. | 707/748 |
| 2002/0194201 A1 * | 12/2002 | Wilbanks et al. | 707/104.1 |
| 2003/0018616 A1 * | 1/2003 | Wilbanks et al. | 707/2 |
| 2005/0038816 A1 * | 2/2005 | Easton | 707/104.1 |

OTHER PUBLICATIONS

M. Armbrust, A. Fox, D. A. Patterson, N. Lanham, B. Trushkowsky, J. Trutna, and H. Oh. Scads: Scale-independent storage for social computing applications. In CIDR. www.crdrdb.org, 2009.
Daniela Florescu, et al, Query Optimization in the Presence of Limited Access Patterns, SIGMOD '99 Philadelphia PA.
Z. Wei, J. Dejun, G. Pierre, C. H. Chi, and M. van Steen. Service-oriented data denormalization for scalable web applications. In WWW '08: Proceeding of the 17th international conference on World Wide Web, pp. 267-276, New York, NY, USA, 2008. ACM.
M. Brantner, D. Florescu, D. Graf, D. Kossmann, and T. Kraska. Building a database on s3. In SIGMOD '08: Proceedings of the 2008 ACM SIGMOD international conference on Management of data, pp. 251- 264, New York, NY, USA, 2008. ACM.

* cited by examiner

*Primary Examiner* — Charles Kim
*Assistant Examiner* — Kurt Mueller
(74) *Attorney, Agent, or Firm* — Joseph Kolodka; Bao Tran

(57) ABSTRACT

A system includes one or more application nodes sending SQL queries to one or more query execution nodes. Each query execution node translates the SQL queries into key-based requests to the storage engine, which comprises one or more storage nodes. The system provides an abstraction layer with an external schema and an internal schema, maps the external schema into the internal schema; and generates one or more microshards for the storage node.

19 Claims, 4 Drawing Sheets

SYSTEM AND METHODS FOR DATABASE DISTRIBUTION AND QUERYING OVER KEY-BASED SCALABLE STORAGE

This application claims priority to Provisional Application Ser. No. 61/160,854, filed Mar. 17, 2009, the content of which is incorporated by reference.

BACKGROUND

One of the key promises of cloud computing is to enable applications to dynamically adapt to growing workloads by elastically increasing the number of servers, which is often referred to as scaling out for evolving workloads from a number of users. It is especially important for web applications to elastically scale out (and in) since workloads from web users are often unpredictable, and can change dramatically over relatively short periods of time. This elastic scaling approach, however, is known to have a key bottleneck: the database, whereas the application itself can scale out by using an increasing number of application servers in parallel.

Relational database management systems (RDBMS) have been offering data partitioning and replication trying to scale on top of parallel computing architecture, as well. However its scalability is too limited for highly scalable web applications. Caching has been extensively applied to web applications. However its applicability is limited for recent web applications because (1) the dynamic content to be served is highly personalized, resulting in a low cache hit rate, and (2) applications are more write-heavy to feature user's input to the system (e.g., Web 2.0 applications).

Software architects typically use database sharding techniques to build scalable web applications on RDBMSs. Instead of letting an RDBMS manage data partitioning and replication on its own, they use multiple independent RDBMSs, each managing its own database node. One key motivation for this approach is that the full and global ACID properties enforced by RDBMSs are often considered as overkill for scale-out applications. However, with this approach, the application is now responsible for managing partitioning and replication, with consistency issues and load balancing in mind. Furthermore, the application has to manage re-partitioning to adapt to changes in data and in workload over time.

Key-value stores, e.g. Amazon Dynamo, provide an alternative to such RDBMS-based sharding approaches. A key-value store typically employs consistent hashing to partition a key space over distributed nodes, where addition and removal of nodes would cause only limited re-partitioning. Unlike database sharding, the key-value store frees the engineers from custom effort on load balancing, data replication, and fail-over. In practical terms, the major benefit is the low operational cost needed to achieve scalability and availability. This benefit has made it possible for key-value stores to be offered as a service.

However, unless the application handles very simple data items, the key-value store pushes further burden on the application logic to access and manipulate the data. Although several systems support more complex structured data, the query and data manipulation interfaces they provide are not as powerful as the relational model offered by traditional RDBMSs. To make it worse, their access APIs are proprietary, which raises concerns about the portability issue (referred to as the vendor lock-in issue).

One of the underlying problems in these recent approaches is the lack of proper abstraction. The key-value store approach gives up, not only ACID properties, but also the key benefit of the relational data model: physical data independence. In order to achieve high performance, the application developer needs to carefully design the data organization on the storage, and to write application logic to access this data in a specific way to this organization. For example, it is a common practice for application developers to aggressively apply denormalization in order to allocate multiple semantically-related entities into a single key-value object. This achieves improved efficiency and enables atomic access to the related data. Such a design decision, even though it is on the physical-organization level, requires rewriting the application logic to take that specific design into account, thus losing the advantage of physical data independence.

SUMMARY

In one aspect, systems and methods are disclosed for automatically mapping a relational schema and query workload to an internal schema that can be used to organize data on a key-based storage engine such that all queries in the workload are executable by generating an abstraction layer with an external schema and an internal schema; mapping the external schema into the internal schema; generating key-based data fragments (microshards) from the internal schema; and sending the microshard to the storage engine.

In another aspect, a system for automatically mapping a relational schema and query workload to an internal schema that can be used to organize data on a key-based storage engine such that all queries in the workload are executable includes means for generating an abstraction layer with an external schema and an internal schema; means for mapping the external schema into the internal schema; means for generating key-based data fragments (microshards) from the internal schema; and means for sending the microshard to the storage engine.

In yet another aspect, systems and methods are disclosed for automatically mapping an external relational schema to an internal schema that is transparent to the client applications. This internal schema is created by doing a denormalization on the external schema, and it also includes extra access paths that are added to make all the queries in the workload executable under the limited data access interface of the key-value store. Each relation in the internal schema is fragmented based on the key of the relation into fragments, called microshards. A microshard is used as the basic unit of data exchange with the underlying key-value storage engine.

In another aspect, a formal method is disclosed for checking the executability of a given query on a given internal schema.

In one aspect, systems and methods are disclosed for automatically mapping an external relational schema to an internal schema that is transparent to the client applications. This internal schema is created by doing some special denormalization on the external schema, and it also includes extra access paths that are added to make all the queries in the workload executable under the limited data access interface of the key-value store. Each relation in the internal schema is fragmented based on the key of the relation into fragments, called microshards. A microshard is used as the basic unit of data exchange with the underlying key-value storage engine.

In another aspect, a method is disclosed for checking the executability of a given query on a given internal schema.

In yet another aspect, a system includes a storage engine; one or more applications to send one or more SQL queries to one or more query execution nodes, each query execution node translating the SQL queries into key-based requests to the storage engine, which comprises one or more storage nodes; each query node comprising a computer system with memory and a processor including computer executable code to generate key-based requests given a SQL query; each storage node comprising a computer system with memory, non-volatile storage device, and processor including computer executable code to handle key-based requests and computer executable code to generate an abstraction layer with an external schema and an internal schema, map the external schema into the internal schema; and generate one or more microshards for the storage engine.

In a further aspect, a computer system for automatically mapping a relational schema and query workload for data in a key-based storage engine includes means for generating an abstraction layer with an external schema and an internal schema; means for applying the internal schema to organize data to so that queries in the workload are executable; means for mapping the external schema into the internal schema; means for generating key-based data fragments (microshards) from the internal schema; and means for sending the microshard to the storage engine.

Advantages of the system may include one or more of the following. The system provides higher scalability for web application with less engineering effort (i.e., fast and inexpensive). Combined with cloud computing infrastructure, it enables elastic resource management of web applications for evolving workloads. The system achieves the fundamental advantage of relational systems: physical data independence, while enjoying the scale-out and reliability of the modern storage engines. A general scheme and system architecture are provided for mapping relational workloads to key-based distributed storage for scale-out applications. The system provides an internal schema design and a method for query executability under limited access patterns.

DESCRIPTION

Figure 1A:
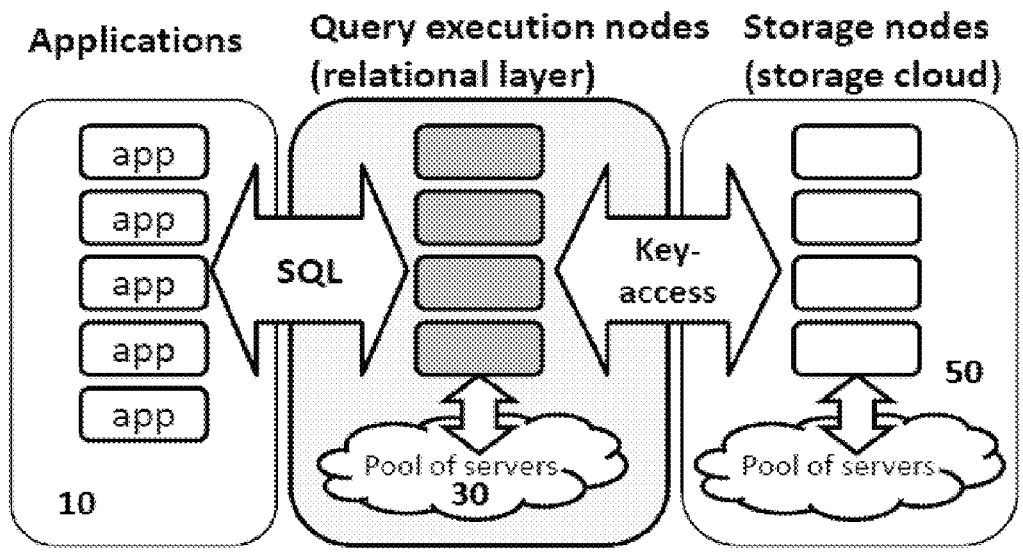
FIG. 1A shows an exemplary architecture of a runtime system in accordance with the present inventive framework.

FIG. 1A shows an exemplary architecture of a runtime system in accordance with the present inventive framework. The system consists of a middle layer providing query execution nodes between application nodes and storage nodes. The applications 10 send database requests such as SQL queries to the query execution layer, which runs on one or more servers 30. This layer intermediates between the applications layer and the storage engine layer 50, which is composed of one or more storage servers running as a key-based scalable storage system. A query execution node automatically transforms each SQL query into key-based operations supported by the storage.

The system of FIG. 1A supports a scheme, called microsharding, which automatically maps relational workload to distributed storage designed for scaling out. The scheme leverages the relational model to provide physical data independence, and still preserves the benefit of the key-value store in terms of scalability. It provides an abstraction layer with external and internal schemas. The external schema is relational, with a relational query workload defined over it, whereas the internal schema, which is transparent to the applications, specifies the data organization on top of the scale-out storage engine.

Figure 1B:
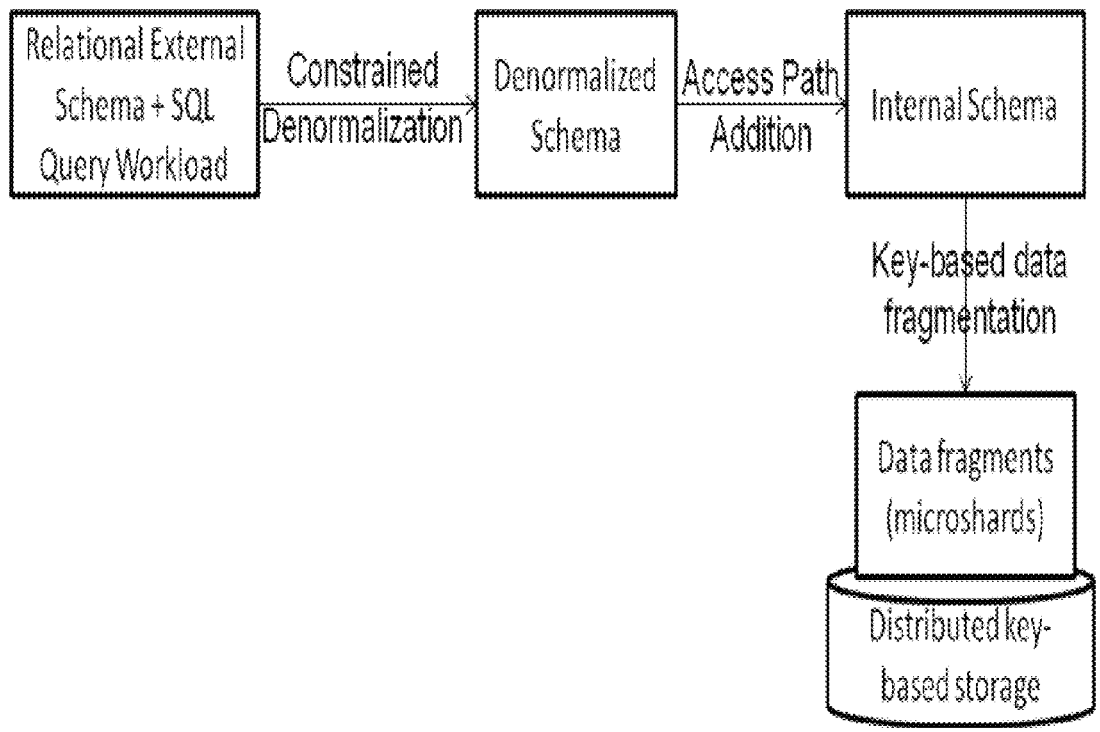
FIG. 1B shows the steps of mapping the relational schema and query workload into key-based data fragments on the key-based storage engine.

FIG. 1B illustrates the Mapping of the external relational schema into an internal one. This mapping involves two main processes: Constrained Denormalization and Access Path Addition. In the former, relations of the external schema are optionally denormalized into nested relations comprising the internal schema. Each such nested relation is then partitioned by the key of its root relation, and the resulting fragments, also called microshards, are handed to the underlying storage engine. This approach for data partitioning corresponds to a horizontal partitioning scheme supported by recent RDBMS products as partitioning by reference. In one scheme, a microshard is the basic unit of exchange between the query engine and the storage engine, e.g. it can be a key-value object in Dynamo, or a row in BigTable, for example. The denormalization is constrained such that no single entity can be duplicated in multiple microshards.

In addition to automatic partitioning and re-partitioning, the microsharding scheme has a key difference compared to the traditional manual sharding approach: the internal schema design is logical. Additionally, the scheme is independent of the physical distribution, which is fully left to the storage engine to manage. Thus, in the context of microsharding, query execution plans cannot assume any physical proximity (e.g. storage on the same node) between the microshards associated with different keys. Specifically, we cannot assume availability of a scan operation over an internal (nested) relation by the storage engine. This limitation is essential since it enables the underlying data store to scale out freely.

The second process in mapping an external schema to an internal one is Access Path Addition. The limitation to access microshards only by key imposes limitations on the feasibility of the different execution plans. A query is executable if it has at least one executable plan. Plan executability is modeled as graph navigability, and thus access paths (i.e. logical indexes) are added to enable navigation patterns needed to make all queries executable. To formally reason about query executability, we model the internal schema as a set of relations with limited access patterns: each relation has a single bound attribute, which is the key, and the rest are free attributes. A tuple (i.e. a microshard in our scheme) can be retrieved only given its key.

In one embodiment, the query workload is available in advance to design internal schema. This is required to guarantee executability of a query. The system supports applications that issue queries based on parameterized query templates, which are pre-defined, and typically embedded in applications. Although an ad-hoc query can be issued, some ad-hoc queries may not be executable, if the internal schema design does not include the required access paths.

The system bridges the gap between the relational model and the scale-out key-value stores. The scheme automates the bridging process, assuming a very basic data access interface of key-value get/put requests. Given a relational schema and query workload, the system creates an internal schema and query execution plans that can be implemented on the underlying storage engine. Then, each relation in the internal schema is automatically partitioned into microshards, which is the basic unit of data exchange between the query engine and the storage engine. A query execution plan is represented as a navigation pattern that retrieves/stores the required microshards. To leverage the distributed storage platform for efficiency (in addition to scalability), the query engine exploits parallelism to overlap the storage requests.

The architecture in FIG. 1 covers a variety of scenarios. One scenario is a typical web application where applications, query execution nodes, and storage nodes are deployed in the same data center. In this case, the application service provider will scale out all the nodes together using the resource pool of the data center. In a different scenario, the application and query execution nodes may be located at the client side (e.g. running on the users' browsers), accessing the distributed storage through the Internet. In this case, query execution nodes naturally scale out as the number of clients grows, and the data provider can scale out the storage nodes simply by adding new machines.

The average response time per request for the storage engine depends on factors decided by the specific instantiation of the architecture. In an environment where both storage nodes and query nodes are located in the same rack, it can be less than a few microseconds, but on cloud environments, the response time can be in the second range. When the response time is relatively large (with respect to the computation time), the query engine can issue multiple requests in the same time using multiple threads, as a latency-hiding mechanism.

In one embodiment, the storage engine supports the following functionalities:

Key-based read/write. Data read/write operation with specifying a key must be supported. Structured data access for each key (e.g., read/write a set of columns of a single row) can be optionally supported. A scan operation is not required.

Update atomicity. Atomic update must be supported within the data associated with a single key, i.e. a microshard in our scheme.

Durability and availability. The storage is responsible of durability and availability of the data.

One exemplary implementation runs on top of one of the simplest key value stores, Voldemort, which is an open source implementation of Amazon Dynamo and supports simple put/get operations to store/retrieve a binary data item associated with a key. Each microshard is encoded as a nested data object and represent it as a key-value object in binary format.

The Dynamo model implements eventual consistency by supporting concurrent versions for each data item. However, in order to satisfy the microshard atomicity requirement, the system uses the strong consistency setting: R+W>N, where R and W are respectively the numbers of replicas for a single read and write operation, and N is the total number of replica for each key. Concurrent updates are detected and prevented by the storage engine, based on the version number (i.e. optimistic concurrency control).

The general architecture of FIG. 1 is applicable to distributed storage engines that support more powerful operations on structured data (e.g. retrieve only part of the microshard). Such engines can enable more efficient query execution, whereas the Dynamo-based implementation needs to read/write the entire microshard. In general, the query optimizer should incorporate such capabilities in the search space and the cost estimation.

To demonstrate the ease of scaling out in response to increase in the workload, a test on Voldemort cluster with 3 nodes was used with various numbers of query nodes. These query nodes are configured to keep executing queries as much as they can. The throughput of the system increased with the number of query nodes, and it reached a maximum of about 4000 queries/sec, at which it was saturated. Then one more Voldemort node was added, which gave a maximum throughput of about 5500 queries/sec. Then with one more node, the system reached 6500 queries/sec. This shows that the system can easily adapt to growing workload simply by adding new nodes to the storage engine, which involves only local automatic data re-distribution as described above. The maximum throughput of the system grows simply by adding storage nodes. In the test embodiment, the system experiences significant change in the maximum throughput achieved simply by adding new nodes to the storage cluster, which is the main challenge for the targeted scale-out application.

The relational workload given to the system includes a relational schema, also referred to as external schema, and a workload of conjunctive query templates. An external schema is given as a directed multigraph D=<R,F> where the set of vertices R represents a set of relations, and the set of edges F represents the foreign key references between relations.

Figure 2:
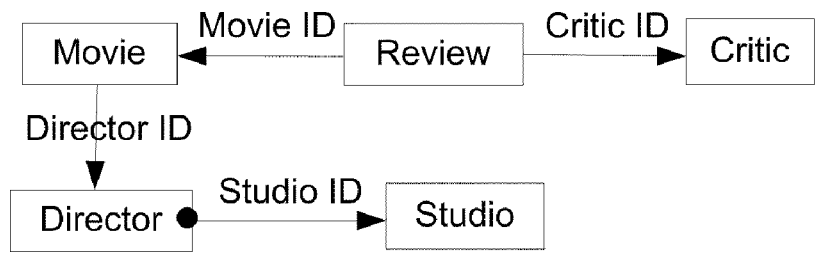
FIG. 2 shows an exemplary relational schema serving as a running example for an external schema.

An exemplary relational schema serving as a running example for the external schema is shown in FIG. 2. The arrows on the relational schema represent the foreign key references (pointers) between relations. A bubble on some side of an arrow indicates that some tuples of the relation at that side may not be involved in any relationship with the tuples of the relation at the other side. For example, a Director may not be affiliated with any specific Studio.

A query workload is given as a set of query templates. In this example, the system supports conjunctive queries, formulated as:

$$q(t_1, \ldots, t_n) \leftarrow I(v) \wedge R_1(t_1) \wedge \ldots \wedge R_n(t_n)$$
$$\wedge c(t_1, \ldots, t_n, v)$$

The term I(v) represents the parameters used to instantiate the query template at runtime.

Each term $R_i$ (t) denotes that t is a tuple in relation $R_i$ ($R_i \in R$).

The complex term $c(t_1, \ldots, t_n, v)$ comprises the join conditions. It is a conjunction of terms, each of which is in the following form: $t_i.a_k=t_j.a_l$ ($t_i, t_j \in \{t_1, \ldots, t_n, v\}$). For brevity, c denotes the set of these terms.

The join condition c also gives an undirected multigraph, called a join graph Join(q), where the vertices represent a set of relations in q, and the labeled edges represent the join condition c. A relation that occurs more than once in q would have multiple vertices (nodes) in Join(q), one for each occurrence. Each value-based equality selection condition in the query (e.g. $R_i.a=100$) is represented as a join with the parameters term I. Non-value-based selection conditions (e.g. $R_i.a=R_j.b$) can be simply represented as annotation on vertices in Join(q). Thus, all the conditions in q are captured in Join(q), and Join(q) is used to analyze and reason about q.

For illustration and experimentation, a simple query workload over the schema of the running example in FIG. 2 is discussed next.

Figure 3:
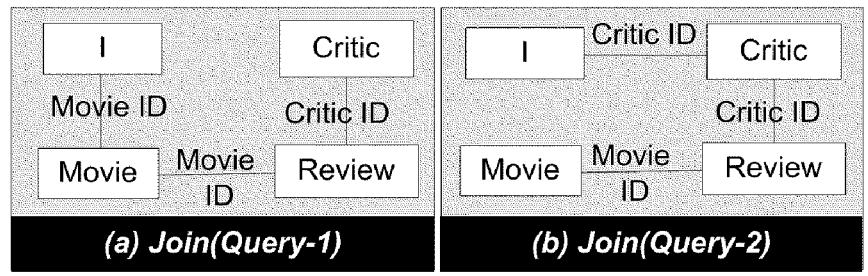
FIG. 3 shows Join Graphs for exemplary queries Query-1 and Query-2, assuming no denormalization.

Query-1: Given a Movie ID, find the Movie information, with its Reviews and the Critics who wrote these reviews.
SELECT * FROM Movie, Review, Critic
WHERE Movie.ID=? AND Movie.ID=Review.Movie AND
   Critic.ID=Review.Critic Query-2: Given a Critic ID, find all the Reviews that the Critic has written, and the Movies for which these Reviews are written.
SELECT * FROM Movie, Review, Critic
WHERE Critic.ID=? AND Movie.ID=Review.Movie AND
   Critic.ID=Review.Critic Query-3: Given type, find movies along with their reviews, such that movie's director is affiliated with studios in some given location.
   SELECT * FROM Movie, Review, Director, Studio
   WHERE Movie.Type=? AND Studio.Location=? AND
Movie.ID=Review.Movie AND Director.ID=Movie.Director
AND Studio.ID=Director.Studio In each query, '?' represents a parameter in the query template, which is replaced by value at runtime. FIG. 3 shows exemplary join graphs Join(Query-1) and Join(Query-2). In FIG. 3, Join(q) contains a node for the parameters term I, which is seen as a virtual input relation with a single tuple containing the input parameters of the query.

Turning now to considerations for the internal schema, the internal schema describes how the database is organized on top of the storage. The schema per-se does not specify how the data is physically distributed on the storage nodes, which is left to the storage engine to manage. This separation of concerns enables the storage engine to achieve the scalability and reliability.

The design of this schema starts with the given external (relational) schema, and the given SQL workload, and it proceeds in two consecutive steps:

1. Denormalization of relations in the external schema to create the internal schema relations, each of which is then fragmented by key into microshards, which is the unit of data distribution. Denormalization helps achieve more efficiency in query execution since a query can find several relevant relations combined together; and thus there is no need for joining them at runtime. It is also useful to leverage atomic update primitives of the storage to implement transactional data processing since the related data are combined together.

2. Addition of access paths (i.e. logical indexes) to overcome the restriction in query execution plans due to the limited data access support of key-based operations.

Such internal schema can be modeled as nested relations with limited access patterns.

In one exemplary scheme, denormalization is introduced in a constrained manner, to design distribution of data over the storage without duplication. It is defined with nesting that combines two relations based on their parent-child relationship, resulting in trees of relations (i.e., nested relations). The data is partitioned into microshards based on keys of the root relations.

One scenario where two relations A and B have parent-child relationship, e.g. Movie and Review in the running example, will be discussed next. If the workload has a query that joins A and B by this parent-child relationship, it is considered as a candidate for denormalization: tuples of B can be nested in their respective parents of A. The benefits of this denormalization are:

1. More efficiency: An execution plan that joins A and B can run faster since they are combined together and accessed by a single key. In this sense denormalization is similar to materializing a join view, but without redundancy since neither A nor B exists separately after denormalization.

2. Enabling atomic access for transaction atomicity: related tuples of A and B (e.g. a Movie and its Reviews) can be manipulated as a unit.

Several relations can be combined together by multiple nesting as long as they are related to each other by parent-child relationships, e.g. Director may have Movies nested under it, with Reviews nested under Movies. Hence, logically speaking, each node in the internal schema graph is a nested relation with a single root relation (Director is the root relation in this example).

To consider the denormalization of B under A, the system requires additional constraints in addition to the parent-child relationship: (1) If relation B has more than one parent (e.g. Review has two parents: Movie and Critic), then it can be nested under at most one of them. This prevents redundancy, and simplifies updates. Thus, each relation of the external relational schema belongs to exactly one node in the internal schema graph. (2) The foreign key in B that refers to A must be defined as NOT NULL. This is obviously required since we do not keep a separate instance of B after it is nested under A. Thus, if a tuple of B is orphan (has no parent tuple in A), it would be lost. For example, Director cannot be nested under Studio since some Directors may have no Studios.

Each nested relation in the internal schema is partitioned into microshards based on the key of the root relation. For example, if Review is nested under Movie under Director, partitioning happens based on the Director ID. Thus, each microshard holds one distinct Director with his Movies and the Reviews of each Movie. We call it 'micro'shard to reflect the fact that it is a small shard because it contains only one element of the root relation (Director in this case), as opposed to general sharding (partitioning) which can be by range or by size or in any other way.

A microshard is the unit of data exchange between the query execution engine and the storage engine, each microshard is accessed by its key, which is the key of the root relation. This explains why atomic access for transactional processing is possible on the tuples that belong to a single microshard.

A nested relation is introduced here only logically; the storage can internally organize each microshard in any form. The storage may even distribute a single microshard into distributed physical items (e.g. BigTable distributes a single row on the distributed file systems GFS) as long as it provides atomic updates.

Up to this moment, the internal schema design only involves nesting of relations. Naturally, a relational query over the external schema can be translated into a nested-relational query over the internal schema. For example, suppose the system denormalizes Review under Movie in the running example. In this case, Query-1 and Query-2 can be translated, respectively, as
SELECT * FROM Movie, Movie.Review AS Review, Critic
WHERE Movie.ID=? AND Critic.ID=Review.Critic
SELECT * FROM Movie, Movie.Review AS Review, Critic
WHERE Critic.ID=? AND Critic.ID=Review.Critic
where Review is unnested from Movie, which corresponds to the join between Movie and Review in the original queries.

Figure 4:
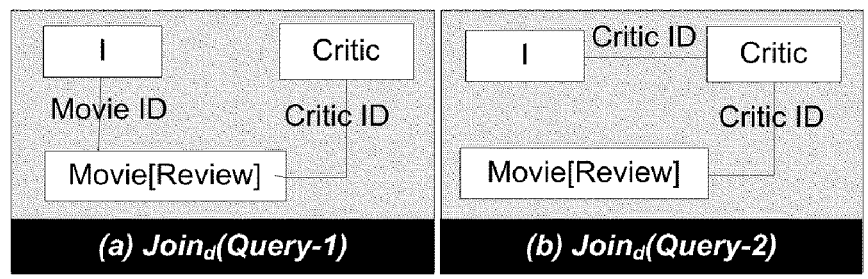
FIG. 4 shows Join Graphs for the exemplary queries Query-1 and Query-2, assuming Review is denormalized under Movie

For a given denormalization scheme d, the join graph of q is referred to as $Join_d(q)$. FIG. 4 shows the join graphs of the exemplary queries Query-1 and Query-2 under a scheme d which denormalizes Review under Movie. In FIG. 4, Movie and Review have been combined in one nested relation.

In general, if two nodes A and B in Join(q) are combined in one relation by denormalization scheme d, then $Join_d(q)$ will contain 1 node for both occurrences of A and B if and only if the following conditions apply:

(1) B is a direct child of A in d.

(2) A and B are connected in Join(q) and one of the connections is labeled by the join condition: Foreign-key(B)=Primary-Key(A).

Formally speaking, if relation B is nested under A, then a join condition between A and B in a conjunctive query $(A(t_1) \wedge B(t_2) \wedge t_r.id=t_2.aid)$ is translated as $(A(t_1) \wedge t_2 \in t_1 \cdot B)$.

In this exemplary design, the database is distributed as two types of microshards on the storage: (1) Movie with Reviews: distributed by Movie ID, and (2) Critic: distributed by Critic ID. To execute Query-1, a query plan can get a Movie/Review microshard using the Movie ID given as a parameter in Query-1, and then use the Critic IDs in the Review.Critic attribute (i.e. the foreign key) to retrieve the relevant Critic microshards. However, Query-2 cannot be executed given a Critic ID since, after a Critic is retrieved by ID, there is no information available to retrieve the corresponding Movie/Review microshards associated with the Critic.

This issue is formalized as query execution in the presence of limited access patterns. The access limitation is modeled using binding patterns. For example, $R(a^b, b^f)$ specifies that values must be given for the attribute a in order to retrieve tuples in R. In our case, each (nested) relation in the internal schema has exactly one attribute which is bound (annotated with b): the key of the root relation.

Executability of a query q is analyzed using a directed multigraph, called the navigability graph Nav(q), which reflects the possible ways to 'navigate' between the relations involved in q. It is derived from the join graph Join(q) by applying the following rules to make each edge A-B directed, or otherwise to remove it.

1. If the join attribute at one end of the edge, e.g. A, is the key of the root relation at this end, the edge becomes directed from B to A. This indicates the possibility to navigate from B to A because, given a microshard containing B, the join attribute in B can be used to retrieve microshard(s) of A, because partitioning and distribution of A happens by the join attribute. It follows that, if the join attributes at both sides are keys of root relations, the edge becomes bi-directional.

2. Otherwise, the edge is removed. In this case, the join attribute is not key at either side, and thus cannot be used to navigate in either direction.

Figure 5:
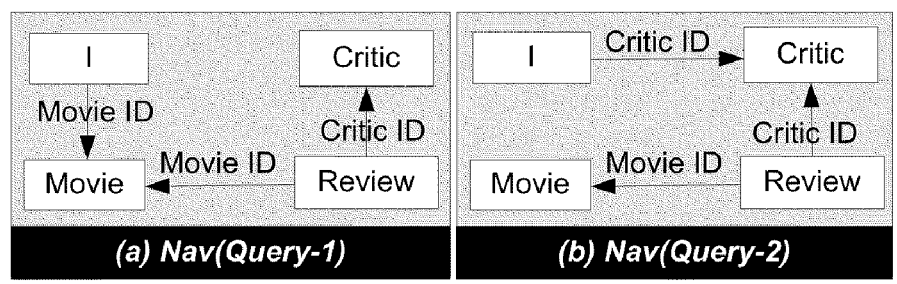
FIG. 5 shows Navigability Graphs for exemplary queries Query-1 and Query-2, assuming no denormalization.
Figure 6:
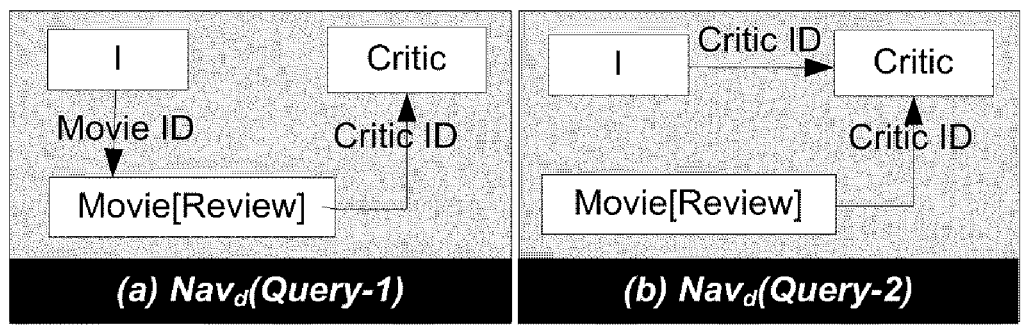
FIG. 6 shows Navigability Graphs for the exemplary queries Query-1 and Query-2, assuming Review is denormalized under Movie

The graphs of FIG. 5 are the result of applying the above rules on the join graphs in FIG. 3, i.e. assuming that no relation has been nested under any other relation by denormalization. FIG. 6 is the result of applying these rules to the join graphs in FIG. 4, i.e. assuming the denormalization scheme has nested Review under Movie.

Query Executability Test: It follows from the navigability graph that a query q is executable if and only if all vertices are reachable from the input parameter I in Nav(q). In FIG. 5, we see that neither Query-1 nor Query-2 are executable. On the other hand, in FIG. 6, Query-1 is executable, while Query-2 is not.

To make a query executable under a given denormalized internal schema, the system adds extra access paths to the internal schema design. Access paths are added to an internal schema in order to enable the navigation patterns required to execute all the queries in the workload. These extra access paths effectively modify navigability graphs by adding some edges, thus enabling more navigation patters to execute the queries.

In the running example, a design where each relation is kept separate (no denormalization), if we add to the internal schema a logical index to Review based on the Movie ID: XReviewMovie(MovieID,ReviewID), a path is created in Nav(Query-1) (FIG. 5(a)), from Movie to Review, and thus making Query-1 executable under this schema: Given a Movie ID, the system can retrieve the Reviews using the index, and from each Review microshard the system retrieves the Critic ID and thus reaches the Critic.

Since an index is a relation introduced as a materialized view, the use of indexes for a query can be seen as rewriting a query to use a view so that it can be executed under limited access patterns. For example, Query-1 can be rewritten to use the index XReviewMovie(MovieID,ReviewID) as:
SELECT * FROM Movie, XReviewMovie, Review, Critic
WHERE Movie.ID=? AND Movie.ID=XReviewMovie.
  MovieID AND Review.ID=XReviewMovie.ReviewID
  AND Critic.ID=Review.Critic The example above shows a case where the index to a relation A (Review) is based on a non-key attribute that is used to join A with another relation B (Movie) in the query q. In general, the join could be any edge between A and any other node in Join(q), including the special parameter node I. This covers cases where the query has a value-based selection condition. For example, a query that has a selection condition on Movie.Type can be executed using an index to Movie based on Movie.Type. Adding this index effectively adds an edge from the parameter node I to Movie in the navigability graph.

In both of the examples above, the index to a relation A is based on a non-key attribute of A. In some cases, we need to add an index on the key of a relation A. This is the case if A is nested under another relation, thus we need an index to translate the key of A to the key of the root relation. For example, if Review is nested under Movie, then we need to add an index that translates a Review ID into a Movie ID: XMovieReview (ReviewID, MovieID). Without such an index, we cannot directly access a Review except through its parent Movie.

All the above examples can be exactly characterized as follows: an edge in Join(q) joins relation A to some other relation (including I), such that the join attribute of A is not the key of the node that contains A in the internal schema. This could be the case if A is not the root of the internal schema node, or otherwise, if the join attribute is not the key of A.

Hence, given a specific denormalization scheme (internal schema), this characterization is used to identify all the indexes that could be used in the execution of any query in the workload. The set of indexes is the relevant indexes under this denormalization scheme.

In general, an index is added to the internal schema graph as a separate relation (node), with an arrow to the target relation. The partitioning key of this relation is the key of the index, and thus every microshard of this relation is an index entry. However, there is a special case that deserves special consideration. If an index is created on relation A based on attribute a, which is itself the key of another root relation B, then we can achieve more efficiency by combining each entry of the index with the tuple of B that has the same key. In the example above where an index XReviewMovie(MovieID, ReviewID) is created on Review by MovieID, we can combine each index microshard with the corresponding Movie microshard. In this case, the navigation of Query-1 can proceed directly from a Movie microshard to the Review microshards without having to access a separate index in the middle. This is illustrated in FIG. 7(a). This combination is used whenever this case arises, otherwise, the index microshards are kept separate.

Figure 7:
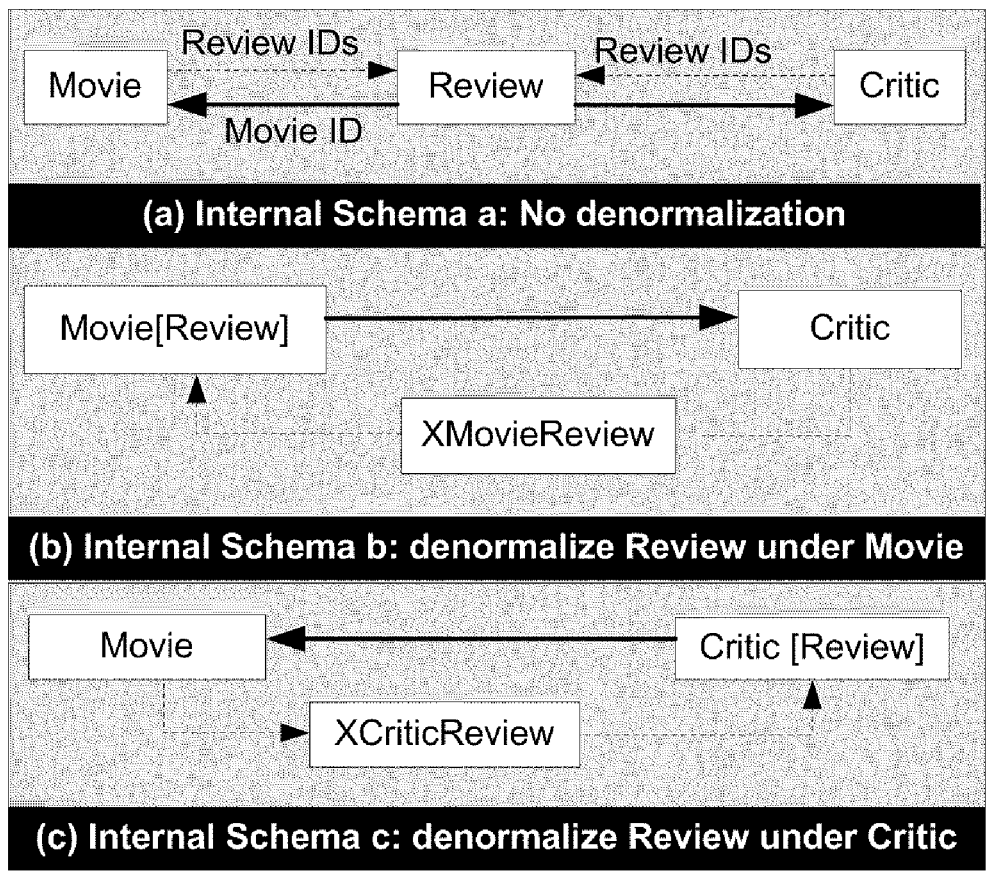
FIG. 7 illustrates various internal designs over which the exemplary queries Query-1 and Query-2 are both executable.

FIG. 7 illustrates various internal designs over which Query-1 and Query-2 are both executable. FIG. 7 shows different internal schema designs for the partial schema of Movie, Review, and Critic. In the illustrations of internal schemas, the access paths that are inherited from the external relational schema (i.e. the foreign key references) are shown as solid arrows, while the added access paths are shown as dashed arrows. FIG. 7(a) illustrates an internal schema design derived by only adding access paths to the external schema without denormalization. FIG. 7(b) shows a design that denormalizes Review Movie. To make Query-2 executable, an access path from Critic to Review, which is under Movie, must be available. In this design, we have an index XMovieReview(ReviewID, MovieID) to make a Review accessible given a Review ID, and we also have an index XReviewCritic (CriticID,ReviewID), which is combined with Critic to achieve more efficiency as described above. FIG. 7(c) is a similar design for the case when Review is denormalized under Critic.

Next, automating the Internal Schema Design is discussed. The execution time of each query in the workload varies under different internal schema designs. In general, the final design should be chosen based on the relative importance (e.g. frequency) and the performance (execution time) of each query under each design. The optimization can be done in a manner similar to physical design optimization of relational databases. In one implementation, a simple greedy heuristic is used. In this implementation, similar to traditional physical design automation, a query optimizer cost estimator is used to estimate the cost of each query under different designs. The design with the best weighted sum of cost is chosen.

The greedy heuristic implementation enumerates the space of the possible denormalization schemes. Each parent-child relationship in the relational schema—with the foreign key defined as NOT NULL—is represented by a binary variable, value 1 means denormalize and value 0 means do not denormalize. The constraint that each relation can be nested under at most one of its parents is captured by a constraint that at most 1 of the corresponding variables can be 1.

The search starts by setting all variables to 0. At each iteration, a single variable is chosen to be set to 1, if it does not break the above constraint. Then the overall cost of the workload (weighted sum) is estimated, assuming all the relevant indexes—as defined above—are available. The search continues until there is no improvement in the overall cost. Then the denormalization scheme of the last iteration is used, and all the relevant indexes that have not been used by the query optimizer in the last iteration are removed.

Given an executable query over the internal schema, a query execution engine navigates through (nested) relations starting from the parameter node I. Information retrieved from one relation is used to further retrieve data from other relations. For example, assuming the internal schema in FIG. 7(a), Query-1 can be executed using this plan: I→Movie→Review→Critics.

Figure 8:
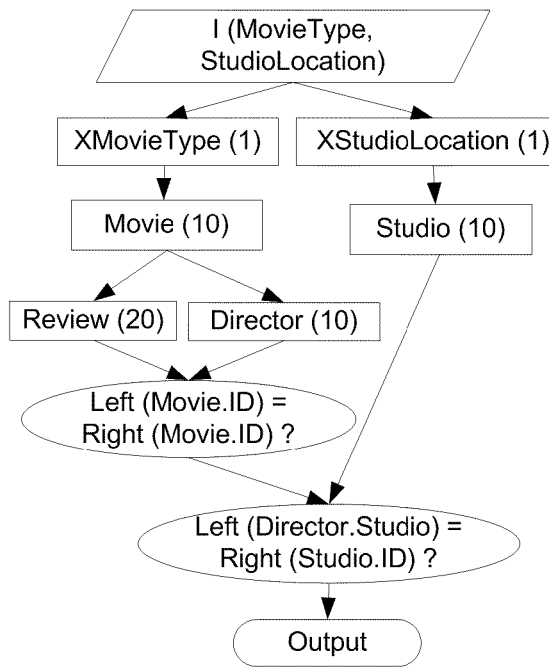
FIG. 8 illustrates one execution plan for exemplary query Query-3.

Query execution can exploit the distribution of the storage engine and issue multiple requests in parallel. In general, there are three possible types of parallelism:

1—Intra-operator parallelism. Multiple pointers (requests) to the same relation can be issued in parallel. For example, FIG. 8 shows an execution plan for Query-3 in which 10 Movie microshards can be retrieved in parallel from a single microshard of the index XMovieType. (e.g. from one Movie microshard, multiple Review microshards can be retrieved in parallel).

2—Inter-operator parallelism. Microshards that belong to different relations can be accesses in parallel, if they are independent. For example, an execution plan for Query-3 may retrieve Movie and Studio microshards (using appropriate indexes) in parallel starting from the parameter I. FIG. 8 shows such a plan.

3—Pipeline parallelism. For example, in FIG. 8, for each Movie microshard, the associated Review microshards can be retrieved without waiting for the other Movie microshards to be retrieved.

Each execution plan has two types of operators: (1) Get operators: used to retrieve microshards from the storage engine and joining them to other microshards retrieved on the same path (from root) on the plan. (2) Merge operators: used to join the retrieved microshards on different paths in the plan (after inter-operator parallelism). In FIG. 8, Get operators are illustrated as rectangles, with the name of the relation and the expected number of retrieved microshards, while Merge operators are illustrated as ellipses with the join conditions.

To formalize, the condition that a partial order can generate an executable plan is discussed and a set of operators with which a plan is generated from a given partial order is also discussed.

Given a query q re-written over the internal schema, the set of executable plans is given as follows. A query plan p is a partial order $<_p$ of relations that appear in $Nav_d(q)$, including indexes. If the keys of relations is available at the time of retrieval, then a plan p is executable if and only if for every relation r (except the input parameter I), there is at least one relation s such that $s<_p r$ and there exists an edge from s to r in the navigability graph. If two relations s and r have no order relation between them, then there is inter-operator parallelism between the operators retrieving s and r. A linear plan is a special case where $<_p$ is a total order, i.e. there is no inter-operator parallelism.

Given a partial order of the query relations and the join graph, a query plan can be constructed as a DAG of operators of two types: Get and Merge. For a relation r in plan p, the ancestors A(r) is defined as the set of relations s such that $s<_p r$. The parents P(r) is defined as the set of relations a∈A(r) such that ó relation s' such that $s<_p s'<_p r$ and AS(r)=A(r)∪{r} ("ancestor-or-self"),and Leaves($<_p$) ("leaf nodes") be a set of relations that are not ancestors of any other relations (i.e. the maximal relations in $<_p$). The parameter I is the only "root" (the minimal relation in $<_p$).

Access to each (nested) relation is done by some Get operator, represented by a rectangle in FIG. 8. The operator retrieves microshards of the relation based on the information available from the ancestors. Consider Query-2 over the internal schema (b) in FIG. 7. At the moment of retrieval from the nested relation Movie[Review], the related tuples in all its ancestors are already retrieved: I, Critic, and XMovieReview. The information available at this point can be logically described as the following query result Qa:

SELECT INTO Qa FROM Critic, XMovieReview WHERE Critic.ID=? AND XMovieReview.ReviewID IN Critic.ReviewIDs Thus, the Get operator is logically equivalent to the output Qb of the following query that joins Qa and Movie[Review]:

SELECT INTO Qb FROM Movie, Movie.Review as Review, Qa WHERE Movie.ID=Q1.MovieID AND Review.ID=Q1.ReviewID This query is executable since the values of Movie.ID are provided from Qa. Note that we use Qa and Qb to describe the input and output of the Get operator only for logical reasoning; Qa does not need to be actually materialized before executing Qb.

Merge operators, represented by ellipses in FIG. 8, are used to combine flows from data streams that have been parallelized by inter-operator parallelism. They are used in two scenarios: (1) If a relation r in p has more than one parent, a Merge operator is used to combine streams from the parents before retrieving r. (2) to combine parallelized streams to give a unified output stream.

Formally, a plan can be constructed from operators as follows.

Get operators: For every relation r, create a Get operator that generates $q_r$ by joining r with the data retrieved from A(r), denoted as $q_{P(r)}$ $$q_r(v,t) \leftarrow q_{P(r)}(v) \wedge r(t) \wedge c(v,t)$$

where c is a subset of edges of the join graph that connect r and a relation in AS(r)

Merge operators: For every relation r such that $|P(r)|>1$, create a Merge operator that generates $q_P(r)$. For simplicity, we only show a case of a binary merge operator.

$P(r)=\{p_1,p_2\}$:

$$q_{\{p_1,p_2\}}(v_1,v_2) \leftarrow q_{p_1}(v_1) \wedge q_{p_2}(v_2) \wedge c(v_1,v_2)$$

where c is a subset of edges of the join graph that connect a relation in $AS(p_1)$-$AS(p_2)$ and a relation in $AS(p_2)$-$AS(p_1)$. Note that $q_{p_1}(v_1)$ and $q_{p_2}(v_2)$ have the common attributes (that are inherited from the common ancestors between $p_1$ and $p_2$) that work as natural join conditions. A Merge operator is also created to merge the streams from Leaves($<_p$) to give a single output stream, i.e. to generate $q_{Leaves(<_p)}$.

The result is an execution plan that starts with the root $I \equiv q_I$ and ends with $q \equiv q_{Leaves(<_p)}$.

For update queries, Update/Insert/Delete operators are provided in a manner similar to Get operators. They are applied on a single (nested) relation and the key of root relation must be provided to execute.

Unlike the case of traditional parallel databases, the distributed storage nodes support a limited operation, and a single query node coordinates the parallel execution. The system supports a homogeneous environment where access pattern to a data source is limited to key-based retrieval, and the response time of requests is critical. The data sources are given from heterogeneous providers in their case: they address the problem specifically for the case where each data source (i.e., web service) has its own limited bandwidth. The system extends RDBMS to enjoy distributed storage that automatically scales out. To achieve high-performance transaction processing for constant workloads, the RDBMS can be built on a tightly-coupled cluster architecture where large scale analytic queries can be processed better by a shared nothing parallel architecture with storage that is optimized for data scan.

The instant framework can support a single-sited transaction, which refers to the case when a transaction accesses data only within a single node of a database cluster. The typical case is when the data is partitioned by reference (i.e., based on a tree of 1-to-n relationships) and a transaction accesses only a tree of tuples in a partition. Microsharding works as partitioning by reference to support this case. Microsharding also provides physical data independence of the relational model.

The application developers can specify transaction requirement as a tree of relations in the external schema, called a transaction tree. The internal schema takes this requirement into account. A transaction of the application is annotated with a transaction tree id when needed. A query in a transaction is still allowed to read data outside of the tree if the application logic can incorporate the resulting relaxed consistency. A typical example in an e-commerce scenario is updating a shopping cart in a transactional manner while referring to product information which might be stale.

There are multiple ways for the internal schema design to support a transaction tree: (1) put the entire transaction tree into a microshard (2) introduce a special microshard that serves as a buffer of transaction updates as a set of redo log records. A redo log records can be used to support atomicity.

The system can also handle range queries. There are two approaches to incorporate range scan in the scheme: (1) leverage range partitioning of the underlying storage (if available) (2) implement range indexes on top of the storage (using B-link trees on top of S3 where each key-value object corresponds to a tree node.) The range scan should be implemented in a transparent manner so that the choice between the above approaches is a matter of optimization.

Although constrained data denormalization that does not duplicate data among microshards is discussed, the system can also work with denormalization that involves distribution of duplicated data to improve read performance. Such materialized views are contemplated by the present inventors.

The distributed storage engines are being adopted as an alternative of an RDBMS where scaling out is crucial and the ACID properties are not mandatory. Such applications can benefit from the relational model, by leveraging physical data independence. The use of microsharding, a scheme of database distribution over such distributed storage, bridges between the recent needs of scale-out applications and the tradition of relational database technologies.

The system may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Figure 9:
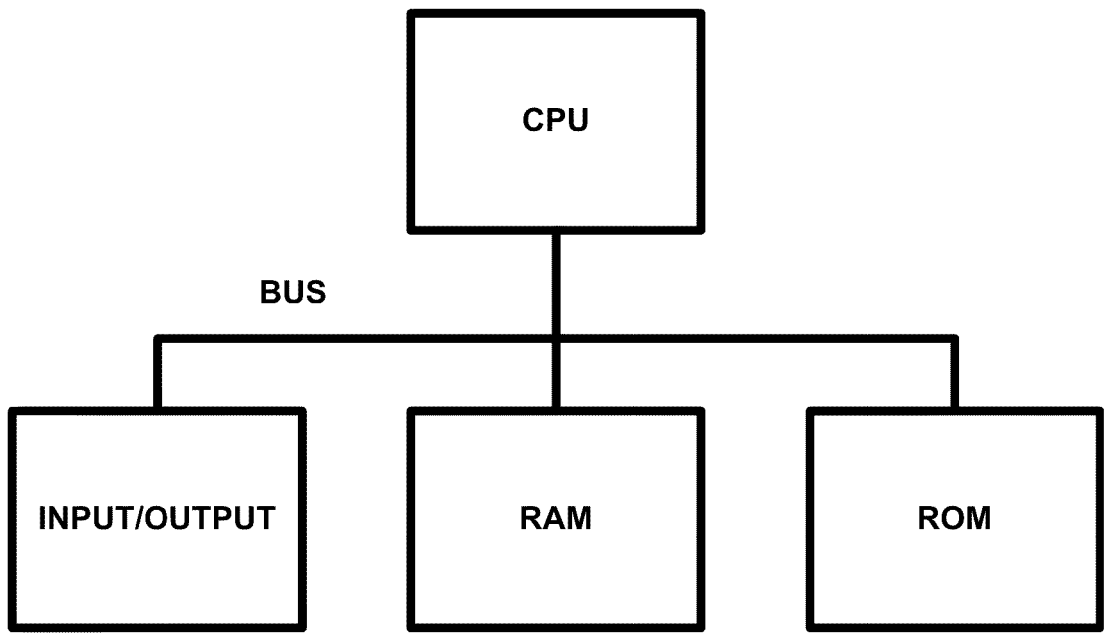
FIG. 9 shows a block diagram of a computer to support the system.

By way of example, FIG. 9 shows a block diagram of a computer to support the system. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

What is claimed is:

1. A method for automatically mapping a relational schema and query workload for data in a key-based storage engine running on a plurality of cloud servers, comprising:
   automatically splitting relational workload to the key-based storage engine as a set of key-based data fragments;
   generating an abstraction layer with an external schema and an internal schema by applying the internal schema to organize data into the set of key-based data fragments and guaranteeing that queries in the workload are executable only using key-based read/write operations of the storage engine;
   converting relational entity of the external schema into key-based data fragments (microshards) of the internal schema;
   storing the microshards into the one or more cloud servers;
   identifying missing access paths for graph navigability for workload queries to be executable;
   adding an index in the internal schema for each missing access path, and
   providing access paths to enable navigation patterns needed to make workload queries executable; and
   executing query workload by reading and writing SQL key-based data fragments in the storage engine on the plurality of cloud servers.

2. The method of claim 1, wherein the mapping the external schema into the internal schema comprises denormalization of relations under a constraint that no single entity in the external schema is duplicated in multiple key-based fragments of the internal schema.

3. The method of claim 2, comprising denormalizing relations of the external schema into nested relations comprising the internal schema.

4. The method of claim 3, wherein each nested relation is partitioned by the key of its root relation, and one or more microshards are provided to the distributed storage engine.

5. The method of claim 3, wherein the denormalization is constrained so that no single entity is duplicated in multiple microshards.

6. The method of claim 1, comprising executing the query if the query has at least one executable plan.

7. The method of claim 1, comprising modeling the schema as a set of relations with limited access patterns and checking plan executability as graph navigability.

8. The method of claim 1, comprising modeling the internal schema as a set of relations with limited access patterns, wherein each relation has a single bound attribute as a key and remaining relations comprise free attributes.

9. A system, comprising:
   a storage engine running on a plurality of cloud servers;
   one or more applications to send one or more SQL queries to one or more query execution nodes, each query execution node comprising a processor including executable code for translating the SQL queries into key-based requests to the storage engine, the engine comprising one or more storage nodes; each node comprising a processor with a non-volatile storage device and executable code to handle key-based requests; and
   computer executable code to generate an abstraction layer with an external schema and an internal schema, map the external schema into the internal schema; store the microshards into the one or more cloud servers; identify missing access paths for graph navigability for workload queries to be executable; add an index in the internal schema for each missing access path, and provide access paths to enable navigation patterns needed to make workload queries executable; store one or more microshards for the storage engine; and execute query workload by reading and writing SQL key-based data fragments in the storage engine on the plurality of cloud servers.

10. A computer system for automatically mapping a relational schema and query workload for data in a key-based storage engine running on a plurality of cloud servers, comprising:
    means for generating an abstraction layer with an external schema and an internal schema,
    means for applying the internal schema to organize data to so that queries in the workload are executable;
    means for mapping the external schema into the internal schema;
    means for generating key-based data fragments (microshards) from the internal schema; and
    means for storing the microshard to the storage engine;
    means for identifying missing access paths for graph navigability for workload queries to be executable;
    means for adding an index in the internal schema for each missing access path, and
    means for providing access paths to enable navigation patterns needed to make workload queries executable; and
    means for executing query workload by reading and writing key-based data fragments in the storage engine on the plurality of cloud servers.

11. The system of claim 10, wherein the means for mapping the external schema into the internal schema comprises Constrained Denormalization and Access Path Addition.

12. The system of claim 11, comprising means for denormalizing relations of the external schema into nested relations comprising the internal schema.

13. The system of claim 12, wherein the denormalization is constrained so that no single entity can be duplicated in multiple microshards.

14. The system of claim 12, wherein each nested relation is partitioned by the key of its root relation, and one or more microshards are provided to the distributed storage engine.

15. The system of claim 14, wherein the denormalization is constrained so that no single entity can be duplicated in multiple microshards.

16. The system of claim 10, comprising means for executing the query if the query has at least one executable plan.

17. The system of claim 10, comprising means for modeling and checking plan executability as graph navigability.

18. The system of claim 10, comprising means for providing access paths (i.e. logical indexes) to enable navigation patterns needed to make workload queries executable.

19. The system of claim 10, comprising means for modeling the internal schema as a set of relations with limited access patterns, wherein each relation has a single bound attribute as a key and remaining relations comprise free attributes.

* * * * *